Sept. 22, 1936.  H. W. EDEN  2,054,969
THERMOHYDROMETER
Filed Aug. 24, 1935  2 Sheets-Sheet 1
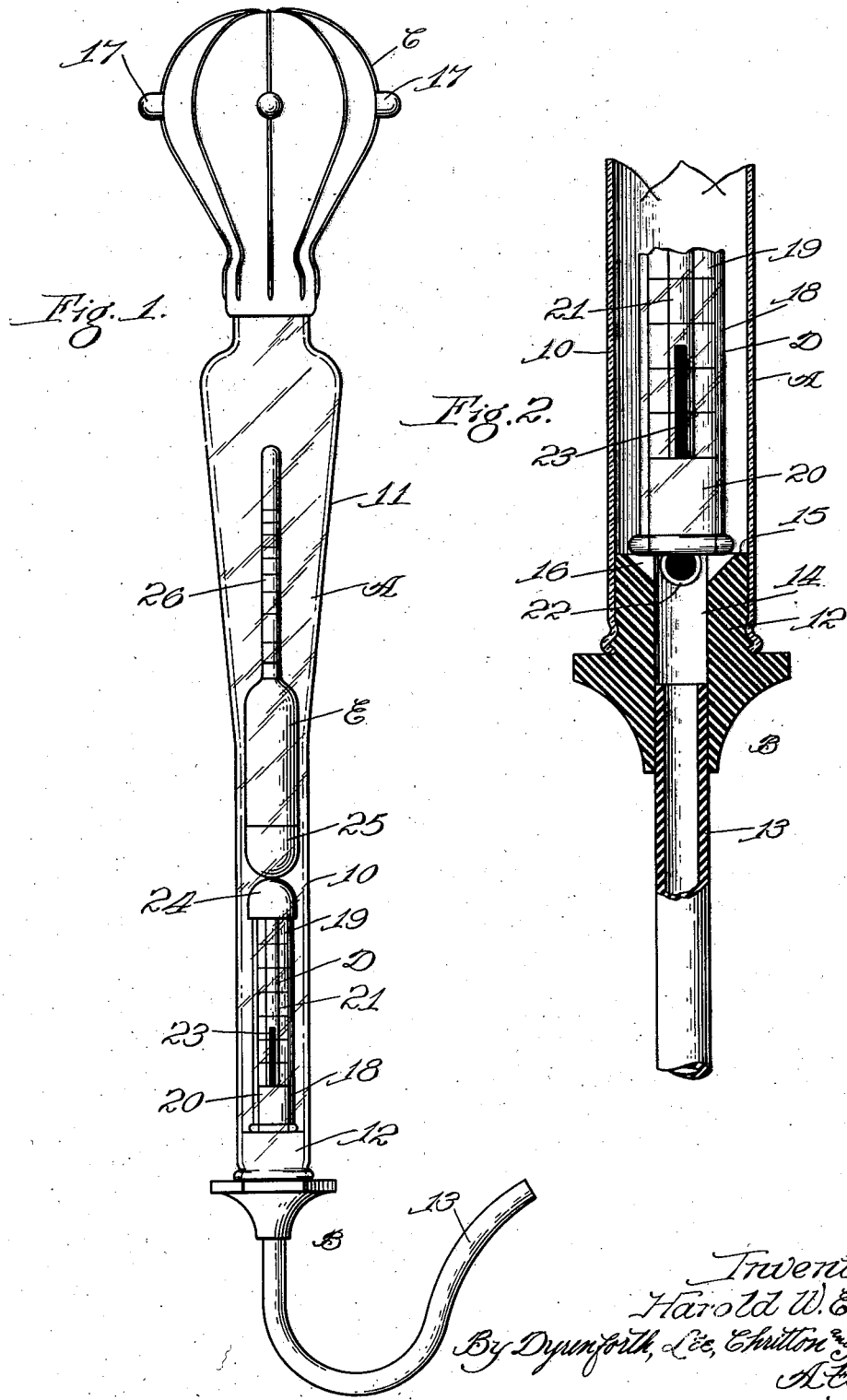
Inventor:
Harold W. Eden.
By Dyrenforth, Lee, Chritton & Wiles.
Attys.

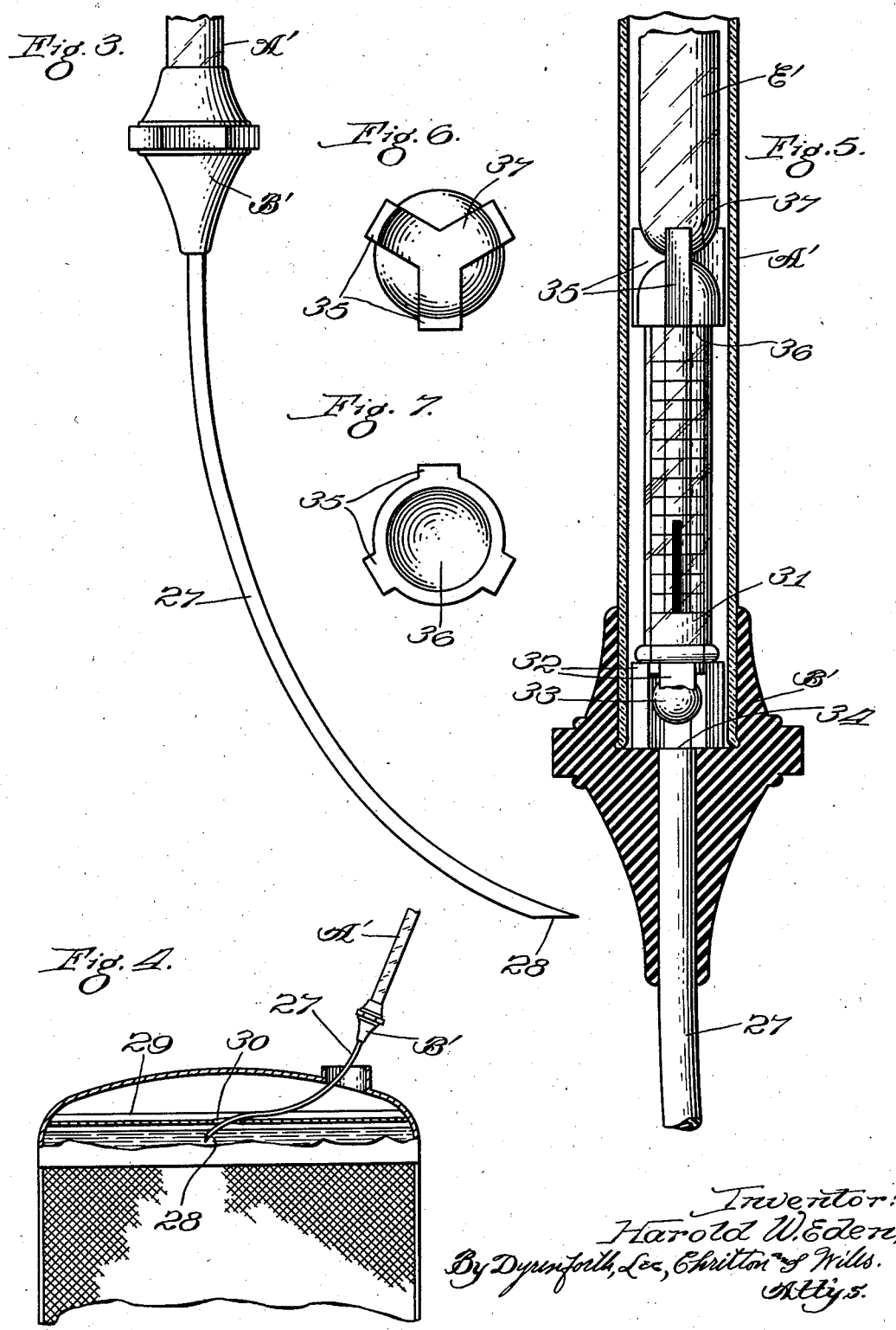

Patented Sept. 22, 1936

2,054,969

UNITED STATES PATENT OFFICE 2,054,969

THERMOHYDROMETER

Harold W. Eden, Chicago, Ill., assignor to Triple-A-Specialty Company, a corporation of Illinois Application August 24, 1935, Serial No. 37,778

6 Claims. (Cl. 265—46)

This invention relates to thermohydrometers adapted to indicate simultaneously the temperature and specific gravity of a liquid, and more particularly to a device for testing the quality of anti-freeze solutions, commonly used in the radiators of internal combustion engines.

The primary object of the invention is to provide an accurate and inexpensive device, which may be cleaned easily and will enable the user to determine the safe temperature to which the solution may be subjected without freezing. In order to accomplish this it is necessary to read with a reasonable degree of accuracy both the temperature and specific gravity of a liquid and by applying these to an associated correction table the safe temperature may be obtained for various anti-freeze solutions.

The present application is a continuation in part of my application, Serial No. 760,013, filed December 31, 1934, for a Thermohydrometer.

Heretofore thermohydrometers have been provided with a fixed thermometer having its bulb fixed in a liquid chamber disposed beneath the housing barrel and exposed to the hot liquid before it reaches the chamber in which the hydrometer-float operates. This arrangement has proven unsatisfactory for careful tests have shown that sometimes there is a difference of as much as 35° in temperature between the liquids in two chambers, due to the fact that the lower chamber is made of insulating material, such as rubber, while the float chamber, or barrel, is usually made of glass which is a good conductor and is exposed to the relatively cold atmosphere. It has also been proposed, heretofore, to join the thermometer with the float member. This arrangement was unsatisfactory for several reasons, the principle being that it was very difficult to make an accurate float bearing so much weight. Also, it was found necessary to use mercury instead of spirits in the thermometer as the quick acting spirit thermometer could not be subjected to the heat necessary in building the rest of the float. Another objection was that the readings on the thermometer were so small that readings could only be made with great difficulty.

In the present invention the non-buoyant thermometer member is loosely enclosed in the same glass chamber that houses the float and readings may be made easily as the thermometer scale is large and close to the transparent wall of the chamber. While the liquid may cool in the barrel slightly while passing from the thermometer to the float, the differential is not so great with the present arrangement and may be compensated for in the indicated readings of the thermometer. Also, in automobiles, the radiator liquid is usually so cloudy that the thermometer cannot be read until the barrel is drained. This is an advantage with the present invention as more time is available for the spirits in the thermometer to act. Obviously, the thermometer is first subjected to the hottest liquid which will bring it up to temperature quickly, and finally it contacts liquid which has been partially cooled at the float. The result is an average reading which cannot be conveniently made until it is sufficiently accurate.

The invention is illustrated in a preferred embodiment in the accompanying drawings in which—

Fig. 1 is an elevational view of a thermohydrometer embodying the invention; Fig. 2, an enlarged broken sectional view of the nozzle head; Fig. 3, a broken elevational view showing a modified form of hose connected to a nozzle head; Fig. 4, a diagrammatic view of a modern radiator showing how the improved hose may be inserted therein; Fig. 5, a broken sectional view showing the lower portion of a modified form of thermohydrometer; Fig. 6, a top plan view of the modified thermometer tube cap shown in Fig. 5; and Fig. 7, a bottom plan view of the cap shown in Fig. 6.

Referring first to the form shown in Figs. 1 and 2 of the drawings, A designates a transparent housing barrel; B, a nozzle-head for the lower end of said barrel; C, a bulb for drawing liquid into the barrel through said nozzle-head; D, a non-floating thermometer-member; and E, a conventional hydrometer-float.

The housing barrel is of the conventional construction and preferably of glass, having a cylindrical lower portion 10 and a pear-shaped upper portion 11.

The nozzle head B shown in Fig. 1 is also of the conventional construction and may comprise an apertured plug 12 adapted to engage the end of the member A, and has a long communicating tubular portion 13 which may be inserted into the liquid to be tested. The head may be provided with an aperture 14 into which the thermometer bulb may extend while the unit is supported on shoulders 15. Suitable cutaway portions 16 are provided to permit the liquid to circulate freely around the thermometer member. For the reasons discussed above it is desired that the thermometer bulb be well towards the top of the aperture 14.

The syringe-bulb C is of the conventional construction and is adapted to fit snugly over the end of the barrel A. It is shown provided with outwardly projecting ears 17 to prevent the instrument from rolling off an inclined surface.

The thermometer member D may comprise an open bottom transparent tube 18, preferably of glass, in which may be placed a scale 19. The tube 18 is shown with glass collar at its lower end. A plug 20 fits snugly into the bottom of the barrel and is perforated to receive the capillary tube 21 which communicates with the bulb 22 and contains colored spirits 23, or the like. As the thermometer-member holds the hydrometer-float E in spaced relation from the nozzle-head B it is provided at its upper end with a cushion which may be in the form of a resilient cap 24.

The hydrometer-float E is of the conventional type having a weighted base portion 25 and a carefully calibrated scale 26 at its upper portion.

The operation of the device is obvious and it will be understood that when the liquid is drawn into the housing barrel A by means of the bulb C the thermometer-member will remain in the lower portion of the barrel while the hydrometer-float will gradually rise and indicate the specific gravity, by the level of the liquid on the scale 26.

Referring now to the modifications shown in Figs. 3-7, it will be seen that a hydrometer barrel A' may be provided with a nozzle-head B' which encircles and forms a lower closure for the barrel. The perforated nozzle-head is provided with a long resilient communicating hose 27 which normally has a curved set, as shown in Fig. 3. This curved set may be obtained by allowing the tubing to remain on a small reel for a considerable length of time. The lower end of the hose is cut at an angle, as shown at 28, so as to taper to a point on the concave side of the hose. As illustrated in Fig. 4, many of the modern automobile radiators have a cap beneath the hood of the car and the radiator is provided with a channel-like baffle plate 29 to prevent surging the liquid when the car goes around a corner. The baffle plate is provided in its central portion with a perforation 30 which is usually about three-fourths of an inch in diameter. This arrangement makes it extremely difficult to thread the ordinary type of hose down into the liquid, but with the present invention the hose is fed into the radiator with the concave side downwardly and the point 28 will easily follow the channel and be projected down through the opening 30 by the hose taking an S-shape, as illustrated in Fig. 4.

The thermometer tube illustrated in Fig. 5 is similar to that shown in Fig. 1 but is provided with a perforated plug 31 which has downwardly and outwardly extending resilient legs 32 which partially enclose and protect the thermometer bulb 33 and encircle the top opening 34 of the hose 27. By this arrangement the bulb is protected while being handled and when placed in operative position the legs distribute the incoming liquid around the bulb without formation of any air pockets. The legs also serve as spacers for centering the non-buoyant thermometer in the lower end of the barrel A' and permit a hot liquid to freely well up around the thermometer to the hydrometer-float E'. The modified cap illustrated in Figs. 5-7 is provided with three upwardly extending ribs 35 and an open bottom hood 36 for snugly receiving the top of the thermometer tube. The hood is further provided with an upwardly presented open cup 37 to loosely receive and center the lower end of a float E'. This arrangement insures all sides of the float to be moistened uniformly by the incoming liquid and forms a cushion to prevent breakage of the float when lowered quickly in the barrel.

It will be readily understood that to clean the device it is merely necessary to remove the head B' and the thermometer and float may be removed and wiped off without difficulty. Although the thermometer bulb 33 is as thin as tissue paper, the legs 32 effectively guard the same against breakage and enable the thermometer to be handled without great care.

The foregoing detailed description has been given for clearness of understanding only, and no unnecessary limitations should be understood therefrom, but the appended claims should be construed as broadly as permissible, in view of the prior art.

I claim:

1. A thermohydrometer comprising: a transparent housing barrel having a nozzle-head depending from said barrel and means for flooding the barrel with liquid from said nozzle-head; a free non-buoyant thermometer in said barrel adapted to rest on the nozzle-head and provided on its upper end with a resilient cap; and a hydrometer-float loosely confined in the barrel above said thermometer and adapted to rest on said resilient cap.

2. A thermohydrometer comprising: a glass-housing member having at its lower end a rubber nozzle-head and at its upper end a rubber bulb adapted to draw liquid into said housing-member through said nozzle-head; a non-buoyant thermometer-member in the lower portion of said housing comprising an open-bottom transparent tube, a scale in said tube, a plug in the lower portion of said tube provided with an aperture, and a thermometer having a bulb below said plug and a communicating capillary tube extending through said aperture into said tube; a resilient cap on the top of the open-bottom thermometer tube; and a hydrometer-float in the housing with its downward travel limited by said cap.

3. A device as specified in claim 2, in which the nozzle-head is apertured to receive the thermometer bulb loosely and has shoulders upon which the bottom of said tube may rest.

4. A syringe hydrometer comprising: a transparent barrel; a suction bulb forming a top closure for said barrel; a liquid-contacting lower closure member for the barrel; a non-buoyant thermometer loosely enclosed by said barrel, said thermometer being provided on its lower end with resilient legs partially enclosing the bulb of said thermometer and supporting the same on the lower closure member, and the top of said thermometer being provided with a resilient cap; and a loose specific gravity float in said barrel adapted to rest on said cap when in its lowermost position in said barrel.

5. A syringe hydrometer comprising: a transparent barrel; a suction bulb forming a top closure for said barrel; a liquid-contacting lower closure member for the barrel; a non-buoyant thermometer loosely enclosed by said barrel, said thermometer being provided on its lower end with resilient legs partially enclosing the bulb of said thermometer and supporting the same on the lower closure member, and the top of said thermometer being provided with a resilient cap providing an upwardly presented cup and adapted to receive and center a float; and a loose specific gravity float in said barrel adapted to rest in said cup when in its lowermost position in said barrel.

6. A syringe hydrometer comprising: a transparent barrel; a suction bulb forming a top closure for said barrel; a liquid-conducting lower closure member for the barrel; a non-buoyant thermometer loosely enclosed by said barrel comprising an open-bottom transparent tube, a scale in said tube, a centrally perforated plug in the lower end of said tube having legs extending downwardly beyond the tube, and a capillary tube extending through said perforation and having a communicating spirit bulb depending from the plug between said legs; a resilient cap on the top of said barrel; and a loose specific gravity float in said barrel adapted to rest on said cap when in its lowermost position in said barrel.

HAROLD W. EDEN.